United States Patent [19]
Levran et al.

[11] Patent Number: 5,047,910
[45] Date of Patent: Sep. 10, 1991

[54] IDEAL SINUSOIDAL VOLTAGE WAVEFORM SYNTHESIS CONTROL SYSTEM

[75] Inventors: Alexander Levran, Los Angeles; Anurag Chandra, Los Alamitos, both of Calif.

[73] Assignee: Teledyne Inet, Torrance, Calif.

[21] Appl. No.: 550,189

[22] Filed: Jul. 9, 1990

[51] Int. Cl.$^5$ .......................................... H02M 7/48
[52] U.S. Cl. ...................................... 363/41; 363/80; 363/98
[58] Field of Search ................. 363/95, 97, 98, 71, 363/72, 41, 43, 80; 364/492

[56] References Cited
U.S. PATENT DOCUMENTS

| | | | |
|---|---|---|---|
| 3,792,286 | 2/1974 | Meier | 307/58 |
| 4,723,201 | 2/1988 | Tanamachi et al. | 363/41 |
| 4,937,720 | 6/1990 | Kirchberg | 363/41 |

Primary Examiner—William H. Beha, Jr.
Assistant Examiner—Bruce Dunn
Attorney, Agent, or Firm—Monty Koslover Assoc.

[57] ABSTRACT

A control system for poly-phase power inverters that uses feedback sensed voltages and currents to control the switching of solid state power switches in the inverter bridges, producing a nearly ideal sinewave voltage output regardless of load induced or switching harmonic voltages. The system operates in combination with the inverter power switches and switch drivers, particularly incorporating a digital programed optimal controller with virtually no delay in implementing the feedback control, and automatically correcting for any sensed line voltage distortions. The system inherently provides a high recovery speed for voltage transients.

5 Claims, 5 Drawing Sheets

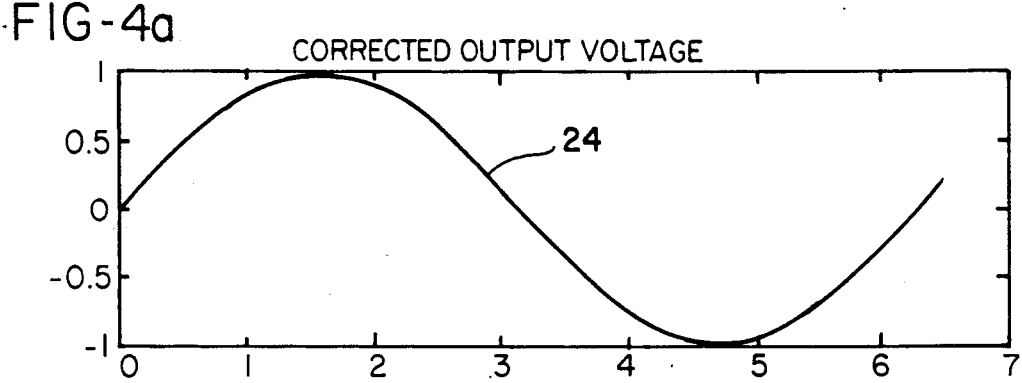
FIG-4a CORRECTED OUTPUT VOLTAGE
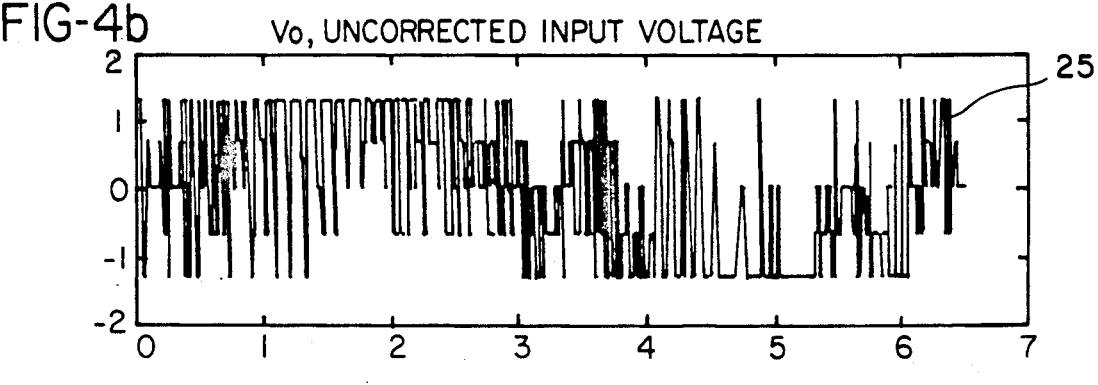
FIG-4b $V_o$, UNCORRECTED INPUT VOLTAGE
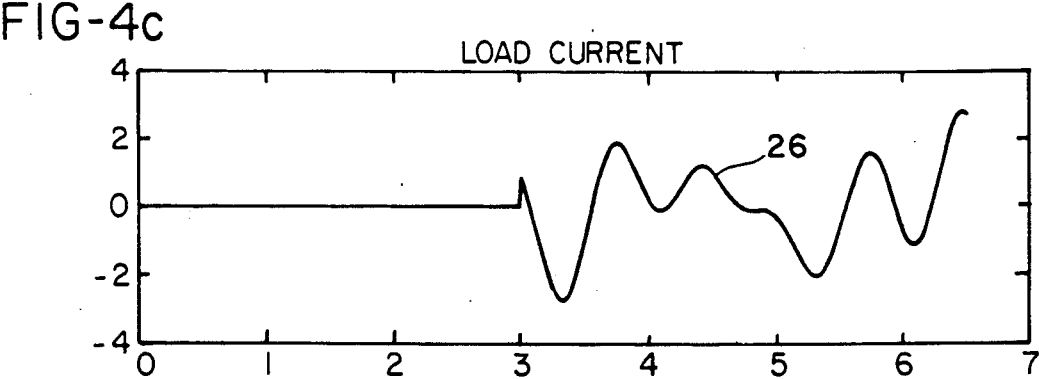
FIG-4c LOAD CURRENT

IDEAL SINUSOIDAL VOLTAGE WAVEFORM SYNTHESIS CONTROL SYSTEM

BACKGROUND AND SUMMARY OF THE INVENTION

This invention relates to controls for solid state electrical power conversion equipment, and particularly to a control system that, in combination with a solid state AC inverter, is capable of producing an ideal sinusoidal voltage waveform output regardless of load induced or switching harmonics.

Present day, solid state switching power inverters produce output voltage waveforms that are somewhat less than ideal sinusoidal in shape. This is in spite of the normally liberal use of harmonic filters at the inverter output and connection to balanced linear loads. The reason is the switching characteristic of the solid state power switches which are arranged in bridges. Depending on the number of poles and switching frequency, harmonic voltages are produced. These harmonic voltages are usually filtered out by L, C and R trap combinations which may be connected at the inverter output. Using this approach, the harmonic voltages can be reduced to a few percent of the fundamental. However, because of the harmonic voltages, the output voltage waveform will show steps or spikes, and will depart from the ideal sinusoidal shape.

If the power inverter has to supply non-linear loads, the waveform distortion becomes greater due to the feedback effect of many sharp swings in the load voltage and current. This distortion is very difficult to correct, using the established state of the art filter methods. Clearly, if a low distortion voltage waveform is specified under non-linear loads, a new approach to the filtering problem is needed. This new approach is provided by the control system invention described herein.

The invention is a control system for poly-phase power inverters that uses feedback sensed voltages and currents to control the on/off switching times of the power inverter switches in the bridges, creating a nearly ideal sinewave voltage output. The control system comprises line inductances and capacitors connected in a filter configuration in the inverter output power lines, voltage and current sense circuits, a load current compensation circuit, a reference sinusoidal voltage generator and an optimal controller.

The load current compensation circuit outputs signals that relate to the sensed load current and line inductance. The optimal controller utilizes signal inputs from the sense circuits, load current compensation circuit and reference sinusoidal voltage generator to produce switching signals to the power inverter driver signals that will result in an ideal sinusoidal voltage inverter output.

The optimal controller is digital, so that there is virtually no delay in implementing the feedback control, making it essentially instantaneous. The control system automatically corrects for any sensed line voltage distortions.

Accordingly, it is a principal object of this invention to provide a control system for poly-phase power inverters that will immediately correct for any line voltage distortions and produce an ideal sinusoidal voltage waveform at the power inverter output.

Another object is to provide a means of control that will provide a high recovery speed for output voltage transients.

Yet another object is to provide a control system that will eliminate DC components in the AC voltage output and decrease transmitted noise.

Further objects and advantages of the invention will become apparent from studying the following portion of the specification, the claims and the attached drawings.

BRIEF DESCRIPTION OF THE DRAWINGS

FIG. 4a is the corrected voltage waveform produced by the present invention when the input voltage and current are typically as shown in FIGS. 4b and 4c; and FIGS. 4b and 4c are voltage and current waveforms typical of those produced by a power inverter supplying non-linear loads.

DESCRIPTION OF THE PREFERRED EMBODIMENTS

Figure 1:
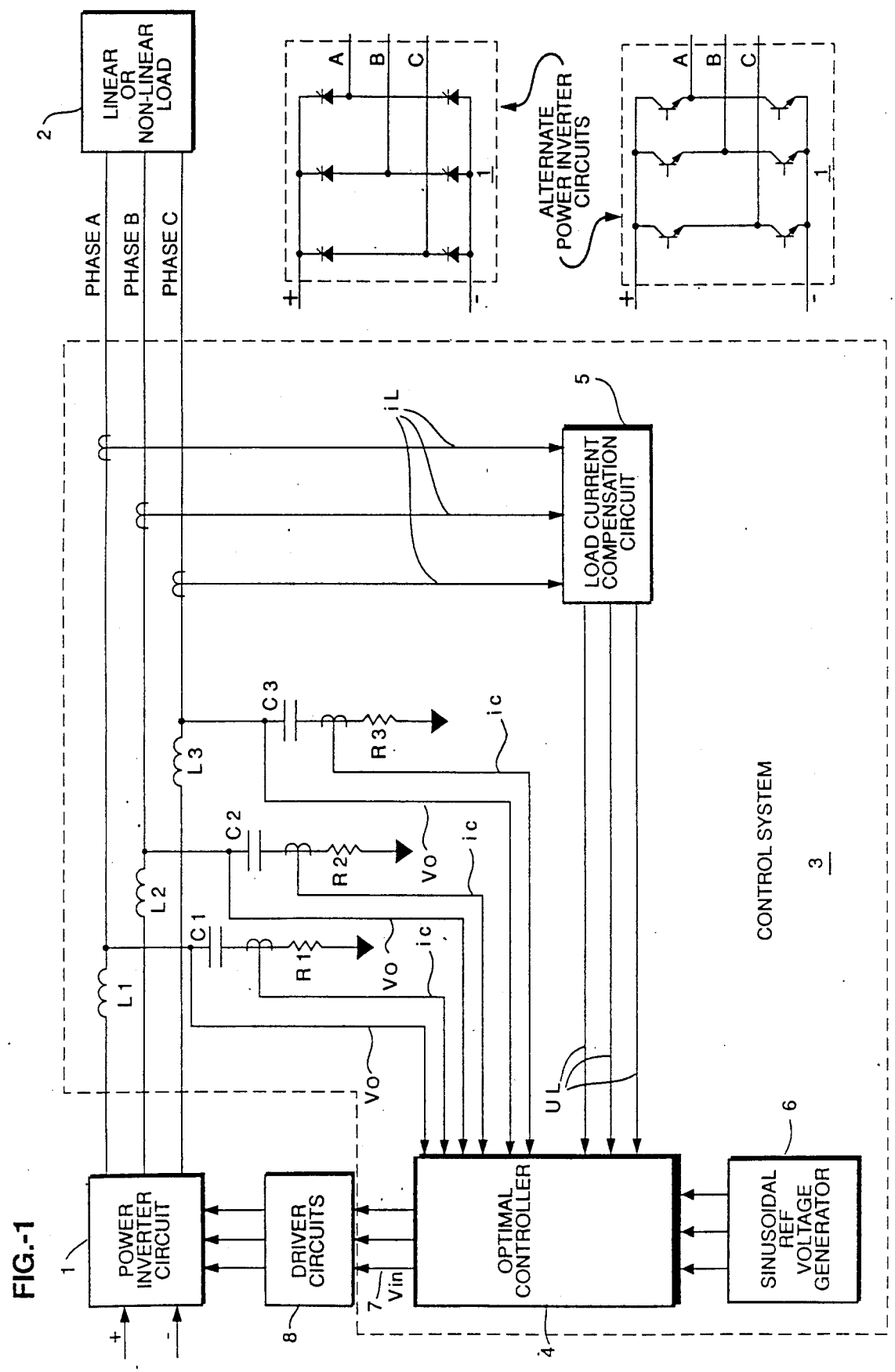
FIG. 1 is a block diagram of a power inverter and distribution system including the control system of the present invention.
Figure 1A:
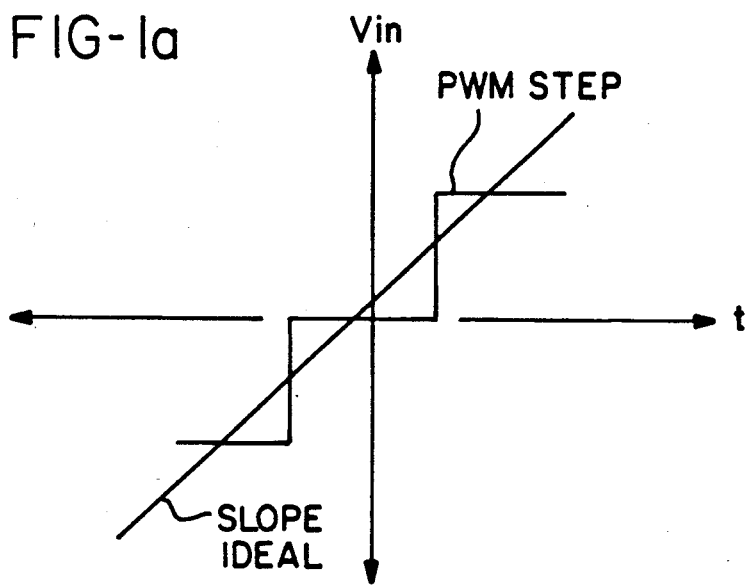
FIG. 1a is a partial plot of the PWM inverter switching scheme which the inverter is required to use.

Referring now to FIG. 1, there is shown a block diagram of a power inverter 1 and its controls 3 which are connected to a load (linear or non-linear) 2. The power inverter 1 utilizes solid state switches such as power transistors, arranged in three sets of bridges to produce three-phase AC approximate sinusoidal output voltages. A three-phase system is shown in FIG. 1 only as an example of poly-phase application. The invention applies equally to any number of AC phases, operating at any frequency. The invention also depends on the power inverter using a Pulse Width Modulated (PWM) step construction of the output sinewave. This is a commonly used form of inverter switching and is partially illustrated in FIG. 1a. The control system 3 will automatically optimize around the switching dead band time of the inverter power transistors. However, optimization speed will be limited by the switching speed of the transistors, so that fast switching transistors such as Insulated Gate Bipolar Transistors (IGBT's) are preferred for best results.

The control system 3 functions in the following manner: In each phase, there is connected a filter and sense means to sense inverter output line voltage waveform and filter current. These comprise and inductor (L1, L2 or L3) in series and a capacitor (C1, C2 or C3) plus a resistor (R1, R2 or R3) in shunt, forming a filter. Typically values for the L, C and R are L=7 mh, C=50 mfd and R=0.1 ohms.

Continually, line voltage signals $V_o$ and capacitor current signals $i_c$ are sampled and transmitted to the optimal controller 4. At the same time, the load current $i_c$ in each phase, is sensed by current transformers in the power lines and is transmitted to the load current compensation means 5 which produces output signals $U_L$ that are related to the load current and fixed line inductance. These output signals $U_L$ are transmitted to the optimal controller means 4. A sinusoidal reference voltage generator means 6 continually produces a pure sinewave reference voltage of five to twelve volts peak at the desired frequency, which may be set at 60 Hz, 400 Hz or other frequency. This sinusoidal 20 voltage signal is also input to the optimal controller 4, where it is used as a model for the desired output voltage waveform.

The optimal controller means 4 comprises digital circuits, including memory storage which operate on the incoming signals to multiply and combine them in a prescribed order, corresponding to the developed equations for optimum switching to produce a sequence of signals Vin 7. This sequence of signals Vin 7, when connected to the inverter switch driver circuits 8, turns the power switches in the inverter 1 on an off, producing an optimum ideal sinusoidal voltage waveform output. A detailed description of the optimal controller means 4 is given later.

The system controls are based upon the following relationships for achieving a sinusoidal voltage. By optimal switching theory, $$Vin = U + U_L \quad \text{(eqn. 1)}$$

where 'U' is the optimal control component which is determined by variational calculus and '$U_L$' is the compensation for sensed load current.

The value $U_L$ is related to load current, line inductance and resistance as shown in equation 2:

$$U_L = Ri_L + L\frac{di}{dt} \quad \text{(eqn. 2)}$$

where
$i_L$ = load current
L = line inductance
di/dt = change in current per unit time By use of state equations for $dVo/dt$ and $di_c/dt$, utilizing the sensed output voltage Vo and filter capacitor current $i_c$ and solving the resulting differential equations, the relationship for U is:

$$U = -P1b1 - P2b2 \quad \text{(eqn. 3)}$$

where
P1, P2 = Lagrange scaling factors (feedback parameters)
b1, b2 = matrix values determined by selected values of line inductance L and resistance R.

The Lagrange scaling factors P1 and P2 are determined from equations 4 and 5:

$$P1 = K11Vo + K12i_c + S1(t) \quad \text{(eqn. 4)}$$

$$P2 = K21Vo + K22i_c + S2(t) \quad \text{(eqn. 5)}$$

where
K = matrix constant
Vo = line voltage
$i_c$ = filter capacitor current
and $$S1(t) = A\sin(\omega t + \phi 1) \quad \text{(eqn. 6)}$$

$$S2(t) = B\sin(\omega t + \phi 2) \quad \text{(eqn. 7)}$$

The optimal controller means 4 is organized to accomplish equation 1 above, implementing equations 3 through 7 above to determine the value of U and adding the value $U_L$ from the load current compensation means 5. The individual circuit embodiment are now discussed further.

Figure 2:
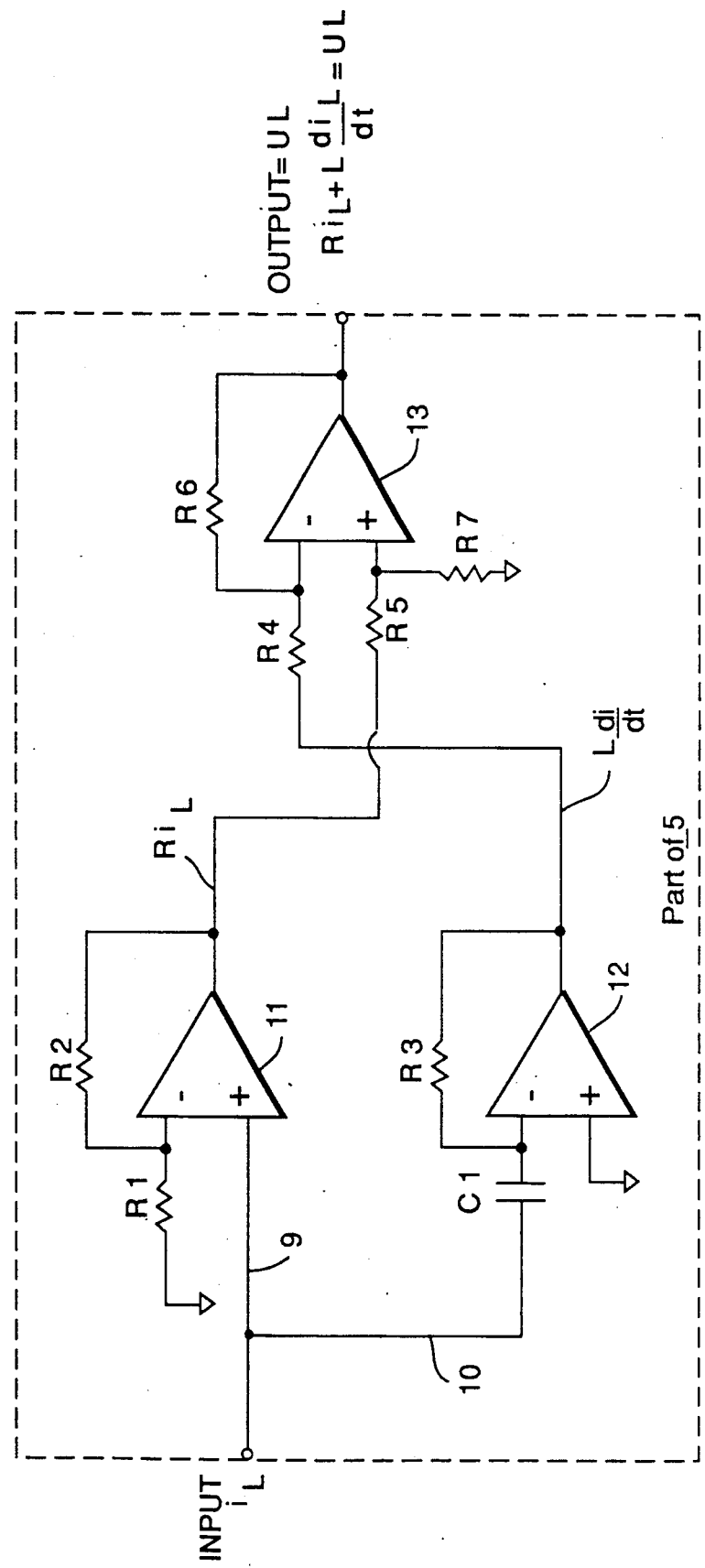
FIG. 2 is a simplified circuit diagram of the load current compensation circuit for one phase of the power inverter output; this circuit being one part of the control circuits of the present invention.

Referring now to FIG. 2, there is shown a preferred means for accomplishing the load current compensation 5 function for phase A load current. This circuit accomplishes equation 2 to produce signal $U_L$. The load current signal $i_L$ derives from a current transformer on phase A and is input to the circuit 5 and applied to two branches, 9 and 10. In the first branch 9, the $i_L$ is signal is connected to the positive input of a first comparator 11, which uses resistor R1 connected to its negative input and feedback resistor R2 to produce output $Ri_L$. In the second branch 10, the $i_L$ signal is connected to a coupling capacitor C1 which is connected in series with the negative input of a second comparator 12. This acts as an inverting amplifier, producing an output signal L di/dt.

The output signal of the comparator 11 is coupled to the positive input of third comparator 13 through resistor R5, while the output signal of the second comparator 12 is coupled to the negative input of a third comparator 13 through resistor R4 in a difference amplifier configuration. The third comparator 13 produces signal $U_L$ for connection to the optimal controller circuit 4.

Figure 3:
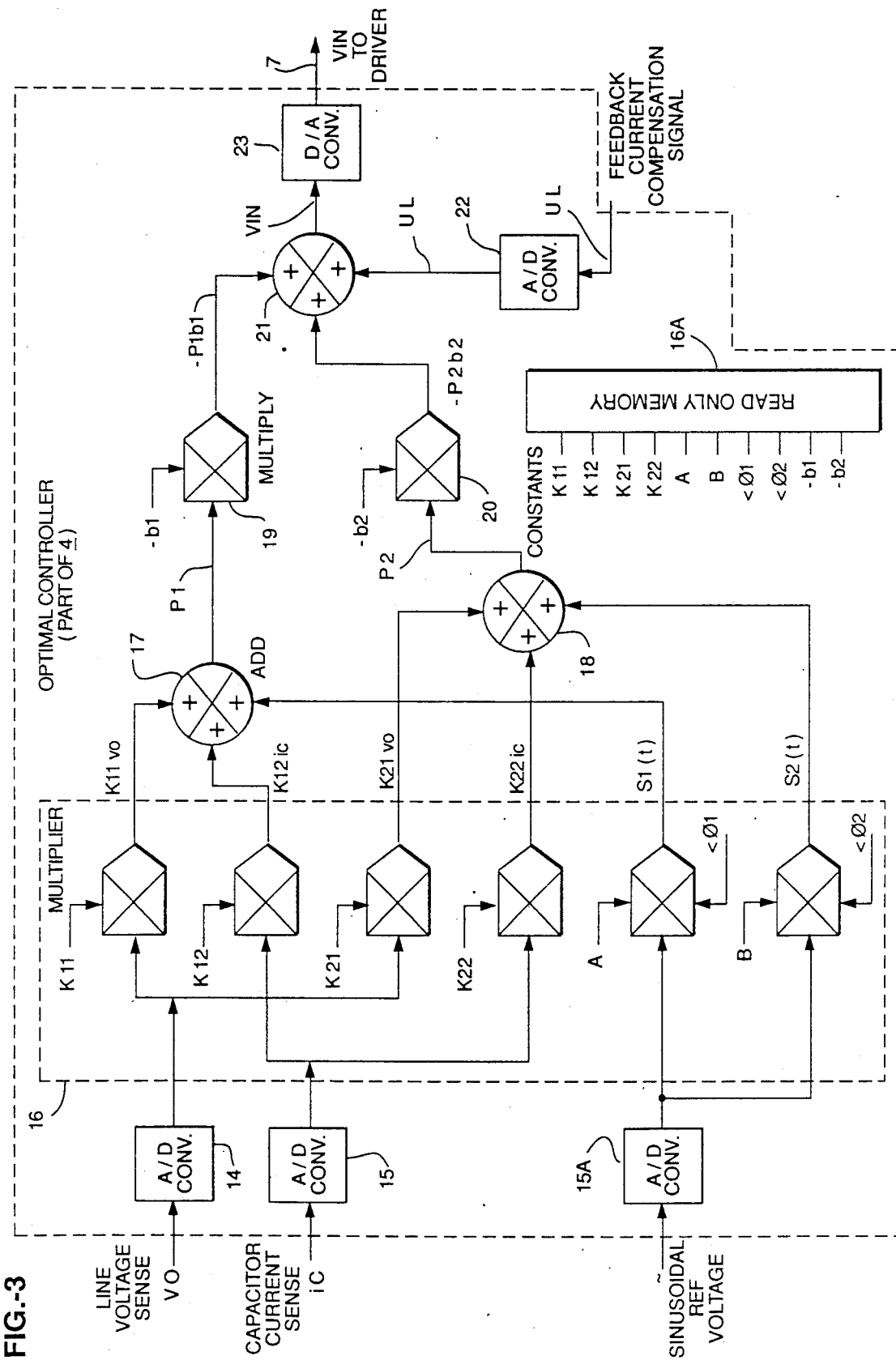
FIG. 3 is a block diagram of a preferred embodiment of the optimal controller functions for one phase, according to the present invention.

FIG. 3 is a functional block diagram of the optimal controller means 4. All the shown functions may be achieved by use of available discrete components in analog circuits. However, it is preferred that the functions be accomplished digitally, because this would bring the overall signal processing times to a minimum of a few microseconds.

Referring to FIG. 3, the line feedback voltage Vo and capacitor current $i_c$ signals from the line filter are connected input to an Analog to Digital (A/D) converter 14, 15 and thence to a first multiplier 16, where the Vo and ic signals are multiplied by stored matrix constants K11, K12, K21 and K22 producing respectively, the products K11 Vo, K12 $i_c$, K21 Vo and K22 $i_c$. Signal products K11 Vo and K12 $i_c$ are connected to the inputs of first adder 17, while signal products K21 Vo and K22 $i_c$ are connected to a second adder 18.

Sinusoidal reference voltage generator 6 produces a perfect voltage sinewave signal described by $K\sin(\omega t)$. This signal is connected input to an A/D converter 15A and thence to an input of multiple channel multiplier 16 where it is multiplied by stored delay angle constants $\phi1$ and $\phi2$ and constants A and B to produce separate signals S1(t) and S2(t). Modified sine reference signal S1(t) is connected input to first adder 17 while output signal S2(t) is connected input to the second adder 18.

First adder 17 adds its input signals together to produce an output signal P1 in accordance with equation 4. Second adder 18 adds its input signals together to produce an output signal P2 in accordance with equation 5. The output signal P1 of first adder 17 is connected to the input of a second multiplier 19, where it is multiplied by stored matrix constant −b1. Similarly, the output signal P2 of the second adder 18 is connected to the input of third multiplier 20, where it is multiplied by stored matrix constant −b2. The products −P1b1 and −P2b2 of second and third multipliers 19 and 20 are connected input to a third adder 21.

A signal $U_L$, which is a feedback signal from the load current compensation circuit 5, is input first to a fourth A/D converter 22 and thence to third adder 21. Here, the three input signals −P1b1, −P2b2 and $U_L$ are added to produce signal Vin. A Digital/Analog converter 23 converts the digital Vin signal to analog 7 for the inverter switch drivers.

The optimal controller circuit shown in FIG. 3 is for a single phase voltage (A, B or C) control. Two more sets of the illustrated circuit means would be required to control the remaining two phase voltages of the three phase power inverter 1 shown in FIG. 1.

The effect of the proposed control system 3 operating together with a solid state power inverter is shown graphically in FIGS. 4a, 4b and 4c. FIG. 4a shows the corrected output voltage waveform 24 as a pure sinewave. FIG. 4b shows the input voltage 25 variations Vo which are sensed at a filter capacitor C1. The extreme variations are primarily due to a non-linear load, but include inverter switching.

A typical example of the load current waveform 26 is shown in FIG. 4c. Here the load changes abruptly from no-load to a non-linear load.

Without the proposed sinusoidal waveform synthesis control system 3 installed, it would take a considerable amount of filter capacitance and inductance on the output of the power inverter 1 to smooth the voltage waveform. For voltage variations such as shown in FIG. 4b, the amount of required filtering would be prohibitive in expense and size. It would also slow the response to transients, probably unacceptable, due to the added impedance. Thus, a filtering approach to the problem is impractical.

On the other hand, the fast response (<5 microseconds) of the proposed control system 3 operating together with fast switching transistors in the inverter 1, means that the speed of recovery is high for voltage transients. Typical recovery times are expected to be in the order of a quarter cycle (6.25 milliseconds for 400 Hz). This is well below the typical specified maximum voltage recovery times for critical load distribution systems.

Finally, for a power inverter having an AC voltage waveform with a fundamental frequency of 400 Hz or higher, the voltage spikes similar to those shown in FIG. 4b due to the load have a relatively high frequency in the range of 20 KHz to 160 KHz. This conducted noise on the power distribution line may interfere with the operation of sensitive equipment. The incorporation of the proposed control system, by producing a smooth sinusoidal output voltage waveform, will eliminate most if not all of the conducted line noise from the inverter.

Various changes and modifications may be made in the construction and mode of operation of the control system described above. These changes, which are in accordance with the spirit of this invention, come within the scope of the appended claims and are embraced thereby.

Having described the invention, what is claimed is:
1. In combination:
   (a) an AC power inverter means comprising a plurality of solid-state switching means connected in a plurality of inverter bridges to produce polyphase AC output power, and switch driver circuits;
   (b) a filter and sense means to sense said inverter output line voltage waveforms and filter current waveforms;
   (c) means for sensing load currents in said AC power inverter output lines;
   (d) means for load current compensation for processing said sensed load currents in accordance with the formula $U_L = R\, i_L + L\, di/dt$, where UL = load current compensation signal, R = line resistance, L = inserted line inductance, $i_L$ = sensed load current, di/dt = change in load current per unit time;
   (e) means for generating a sinewave voltage reference; and
   (f) an optimal controller means, including digitial circuits and memory storage means arranged and connected to operate on the incoming signals from said filter and sense means, from said load current compensation means and from said means for generating a sinewave voltage reference, to produce a sequence of signals Vin for optimal switching of said inverter switching means in accordance with the formula: $Vin = U + U_L$, where
   $U_L$ = load current compensation signal,
   $U = -P_1 b_1 - P_2 b_2$,
   where P1, P2 are Lagrange scaling factors derived from signal feedback parameters, and modified by the sinewave voltage reference,
   where b1, b2 are matrix values determined by selected values of line inductance and line and sense filter resistance; said sequence of signals Vin, when connected to said switch driver circuits, causing said inverter switch means to turn on and off in a sequence producing and inverter optimum sinusoidal voltage waveform output.

2. The combination of claim 1 wherein:
said AC power inverter means includes solid state switching means, supporting circuits and switch driver circuits to produce single phase AC output power.

3. The combination of claim 1 wherein:
said filter and sense means includes, for each inverter output phase, a filter circuit comprising an inductor which is connected in series in the power line, a capacitor and resistor which are connected in shunt to said inductor, and a sense current transformer; said filter circuit providing for sensing line voltage waveforms and capacitor current waveforms as required for feedback signals for input to said optimal controller.

4. The combination of claim 1 wherein:
said means for load current compensation includes, for each output phase, a circuit for performing said current compensation function; said circuit comprising first, second and third comparators, a coupling capacitor and comparator resistor feedback networks; the sensed load current signal $i_L$ being connected input to the positive input terminal of said first comparator and in parallel to said coupling capacitor; said first comparator having representative values of resistance in its connected network sufficient to produce a signal $R\, i_L$ at its output terminal, and connecting said signal $R\, i_L$ to the positive input of said third comparator; said coupling capacitor being connected in series with the negative input of said second comparator which is configured as an inverting amplifier and producing a signal equivalent to L di/dt at its output terminal, said second comparator output being coupled to the negative input of said third comparator which is configured as a difference amplifier; said third comparator producing load current compensation signal $U_L$ at its output terminal for connection as an input to said optimal controller means.

5. The combination of claim 1 wherein:

said optimal controller means includes a circuit channel for each inverter output phase, comprising:

three A/D converters which are coupled to the signal inputs for digitizing the analog input signals for line voltage Vo, filter capacitor current $i_c$ and sinusoidal reference voltage;

a read-only memory (ROM) for storing constants used in the optimal controller computations;

a multiple channel multiplier for multiplying the sensed voltage and current signals and reference sinusoidal voltage by constants stored in said ROM;

a first and second adder, each separately coupled to the outputs of said multiple multiplier and producing signals equivalent to said P1 and P2 scaling factors;

a second and third multiplier; the second multiplier coupled to said first adder and processing input signals P1 and constant −b1 to produce −P1b1; the third multiplier coupled to said second adder and processing input signals P2 and constant −b2 to produce signal −P2b2;

a fourth A/D converter which is coupled to the signal $U_L$ from said load current compensation means;

a third adder coupled to the outputs of said second and third multiplier and said fourth A/D converter for combining the signals to produce output sequence signals V in; and a D/A converter which is coupled to the output of said third adder for converting the digital signals to analog format for said switch driver circuit in said AC power inverter.

* * * * *